(12) United States Patent
Niedfeldt et al.

(10) Patent No.: US 10,465,591 B2
(45) Date of Patent: Nov. 5, 2019

(54) AFTERTREATMENT SYSTEM MOUNTING ASSEMBLY

(71) Applicant: Cummins Emission Solutions Inc., Columbus, IN (US)

(72) Inventors: Joshua D. Niedfeldt, Stoughton, WI (US); Jason D. Meier, Fitchburg, WI (US); Gordon Loraas, Volga, SD (US); Connor Pierce, Heuvelton, NY (US); Tejas S. Pandya, Oxford, MS (US); Tyler K. Lorenz, McFarland, WI (US); Oluwaseun Ogunnoiki, Madison, WI (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 15/759,652

(22) PCT Filed: Sep. 17, 2015

(86) PCT No.: PCT/US2015/050729
§ 371 (c)(1),
(2) Date: Mar. 13, 2018

(87) PCT Pub. No.: WO2017/048260
PCT Pub. Date: Mar. 23, 2017

(65) Prior Publication Data
US 2018/0258828 A1 Sep. 13, 2018

(51) Int. Cl.
*B01D 53/94* (2006.01)
*F01N 13/18* (2010.01)
*F01N 3/20* (2006.01)

(52) U.S. Cl.
CPC ..... *F01N 13/1855* (2013.01); *B01D 53/9418* (2013.01); *F01N 3/2066* (2013.01);
(Continued)

(58) Field of Classification Search
CPC ............. F01N 13/1855; F01N 3/2066; F01N 13/1811; B01D 53/9418
(Continued)

(56) References Cited

U.S. PATENT DOCUMENTS 3,656,608 A 4/1972 Lichti
8,281,603 B2 10/2012 Johnson
(Continued)

OTHER PUBLICATIONS

$201CStacking Disk Springs$201 D Belleville Springs [online]. Jan. 28, 2014. Retrieved on Nov. 14, 2015. Retrieved from the Internet: http://web. <Archive.org/web/20140128064657/http://www.BellevilleSprings.com/decking-disc-springs.html>; p. 1.
(Continued)

*Primary Examiner* — Tom P Duong
(74) *Attorney, Agent, or Firm* — Foley & Lardner LLP (57) ABSTRACT

An aftertreatment system comprises a housing including a housing mounting surface and a mounting aperture defined therein. A frame has a frame first surface, a frame second surface opposite the frame first surface and defines a frame throughhole therethrough. The housing mounting surface is in contact with the frame first surface such that the frame throughhole is axially aligned with the mounting aperture. A biasing member includes a biasing member proximal end contacting the frame second surface proximate to the frame throughhole. A sleeve has a sleeve proximal end which is inserted through the frame throughhole. A sleeve distal end first surface of the sleeve is in contact with a biasing member distal end. A fastener including a fastener proximal end is inserted through the sleeve channel into the mounting aperture and removably coupled to the mounting aperture so that the biasing member is at least partially compressed.

22 Claims, 5 Drawing Sheets (52) U.S. Cl.
CPC ...... *F01N 13/1811* (2013.01); *F01N 2590/08* (2013.01); *F01N 2610/14* (2013.01); *F01N 2610/1406* (2013.01); *Y02A 50/2325* (2018.01); *Y02T 10/24* (2013.01)

(58) Field of Classification Search
USPC ........................................................ 422/168
See application file for complete search history.

(56) References Cited

U.S. PATENT DOCUMENTS

| | | |
|---|---|---|
| 2011/0023472 A1 | 2/2011 | Saito et al. |
| 2011/0146944 A1 | 6/2011 | Hand et al. |
| 2011/0283687 A1 | 11/2011 | Dobler et al. |

OTHER PUBLICATIONS

International Search Report and Written Opinion issued for PCT/US2015/050729, dated Dec. 21, 2015, 25 pages.

AFTERTREATMENT SYSTEM MOUNTING ASSEMBLY

CROSS-REFERENCE TO RELATED APPLICATIONS

The present application is a National Stage of PCT Application No. PCT/US2015/050729, filed Sep. 17, 2015, the contents of which are incorporated herein by reference in their entirety.

TECHNICAL FIELD

The present disclosure relates generally to systems and methods for mounting aftertreatment systems on a structure.

BACKGROUND

Aftertreatment systems include various components that are positioned inside a housing. The housing of the aftertreatment system is mounted on a chassis or a frame of an apparatus (e.g., a vehicle or a generator set) via mounting members or fasteners. Temperature changes, for example due to hot exhaust gases passing through the housing, very high or low ambient temperature, etc. can cause the housing of aftertreatment systems to expand or contract. Aftertreatment systems are mounted to frames or chassis using fasteners. However, fasteners or mounting assemblies are not configured to accommodate thermal expansion or contraction of the housing of aftertreatment systems. This can cause stresses to develop at the mounting locations of the housing. Particularly large aftertreatment systems can experience significant expansion, for example in the order of a few centimeters. The mechanical stresses developing in the housing of such aftertreatment systems at the mounting locations due to thermal expansion/contraction can ultimately lead to cracks or otherwise damage to the housing of the aftertreatment system, the mounting hardware, frame or chassis.

SUMMARY

Embodiments described herein relate generally to systems and methods for mounting aftertreatment systems on a structure, and in particular to mounting assemblies that include a fastener and a sleeve inserted through a frame and a housing of the aftertreatment system to couple the frame to the housing. A biasing member is positioned between the frame and the sleeve and provides a clamp force to couple the frame to the housing while allowing motion of the housing relative to the frame to accommodate thermal expansion.

In a first set of embodiments, an assembly for an aftertreatment system comprises a housing defining an internal volume for housing components of the aftertreatment system. The housing includes a housing mounting surface. A mounting aperture is defined in the housing mounting surface. A frame having a frame first surface and a frame second surface opposite the frame first surface. The frame defines a frame throughhole therethrough. The housing mounting surface is positioned in contact with the frame first surface such that the frame throughhole is axially aligned with the mounting aperture. A biasing member includes a biasing member proximal end and a biasing member distal end. The biasing member proximal end contacts the frame second surface proximate to the frame throughhole. A sleeve has a sleeve proximal end, a sleeve distal end and defines a sleeve channel therethrough. The sleeve proximal end is inserted through the frame throughhole. A sleeve distal end first surface of the sleeve is in contact with the biasing member distal end. A fastener includes a fastener proximal end and a fastener distal end. The fastener proximal end is inserted through the sleeve channel into the mounting aperture and removably coupled to the mounting aperture.

In a second set of embodiments, a mounting assembly for mounting a housing including a housing mounting surface defining at least one mounting aperture, to a frame which includes a frame defining a frame throughhole therethrough axially aligned with the at least one mounting aperture, comprises a biasing member. The biasing member includes a biasing member proximal end and a biasing member distal end. The biasing member proximal end is configured to be positioned in contact with the frame proximate end to the frame throughhole. A sleeve has a sleeve proximal end and a sleeve distal end and defines a sleeve channel therethrough. The sleeve proximal end is configured to be inserted through the frame throughhole. A sleeve distal end first surface of the sleeve is configured to contact the biasing member distal end. A fastener includes a fastener proximal end and a fastener distal end. The fastener proximal end is insertible through the sleeve channel into the mounting aperture and is removably coupleable to the mounting aperture.

In a third set of embodiments, a method of mounting an aftertreatment system on a frame, comprises positioning a housing mounting surface of a housing of the aftertreatment system in contact with a frame first surface of the frame. At least one mounting aperture defined in the housing mounting surface is axially aligned with at least one frame throughhole defined in the frame. A biasing member is positioned on the frame. The biasing member includes a biasing member proximal end and a biasing member distal end. The biasing member proximal end is positioned on a frame second surface of the frame opposite the frame first surface. The biasing member is positioned proximate to the frame throughhole. A sleeve proximal end of a sleeve is inserted through the frame throughhole. The sleeve defines a sleeve channel. A sleeve distal end of the sleeve extends distal from the frame and is in contact with the biasing member distal end. A fastener proximal end of a fastener is inserted through the sleeve channel into the mounting aperture. The fastener proximal end is coupled to the mounting aperture. A fastener distal end of the fastener engages the sleeve distal end to at least partially compress the biasing member.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods for mounting aftertreatment systems on a structure, and in particular to a mounting assembly that includes a fastener and a sleeve inserted through a frame and a housing of the aftertreatment system to couple the frame to the housing. A biasing member is positioned between the frame and the sleeve and provides a clamp force to couple the frame to the housing while allowing motion of the housing relative to the frame to accommodate thermal growth.

Embodiments of the systems and methods for mounting aftertreatment systems on a frame as described herein may provide benefits including, for example: (1) exerting a constant clamp force via a biasing member, instead of using a fastener for coupling the frame to the housing; (2) pre-compressing the biasing member to provide sufficient clamping force on the frame and housing while allowing the housing to move or vibrate to accommodate thermal expansion; (3) sandwiching the frame between a bracket and a spacer, which can have a suitable coefficient of friction (e.g., formed from a low coefficient of friction material or coated with an anti-friction coating) to facilitate sliding of the housing of the aftertreatment relative to the frame to accommodate thermal expansion while functioning as a standard fastener joint against vibration; and (4) providing the ability to use inexpensive, "off the shelf" parts to achieve the functions described herein, rather than requiring more expensive, custom-made components.

Figure 1:
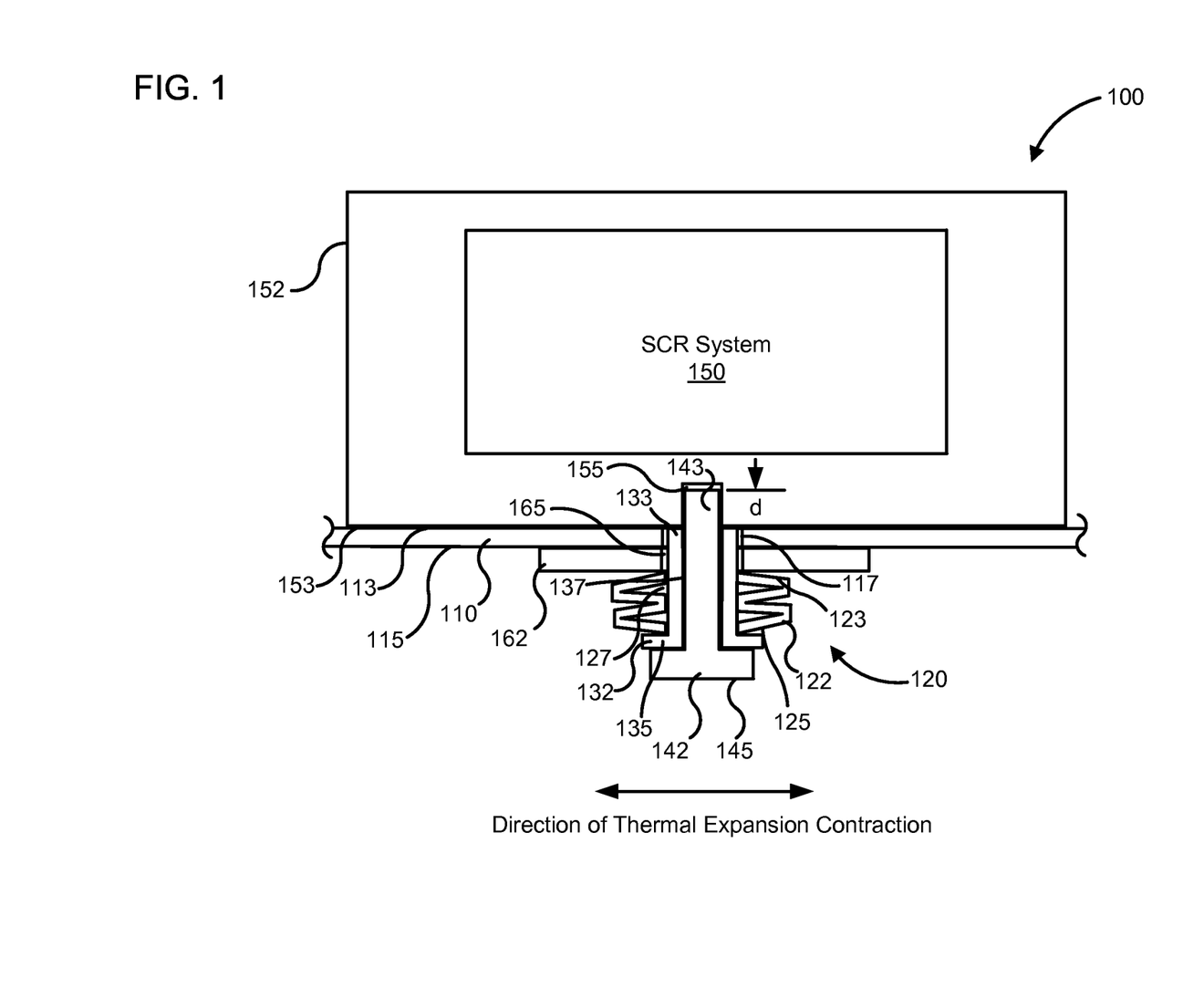
FIG. 1 is a schematic illustration of an aftertreatment system mounted on a frame using a mounting assembly, according to an embodiment.

FIG. 1 is a schematic illustration of an embodiment of an aftertreatment system 100 which can be used to receive and treat an exhaust gas to decompose constituents of the exhaust gas flowing therethrough. The aftertreatment system includes a housing 152 defining an internal volume within which various aftertreatment components can be positioned. For example, FIG. 1 shows a selective catalytic reduction (SCR) system 150 positioned inside the housing 152. In other embodiments, various other aftertreatment components can be positioned in addition to or instead of the SCR system 150 inside the housing such as, for example particulate filters, oxidation catalysts, flow mixers, sensors (e.g., temperature sensors, oxygen sensors, NOx sensors, ammonia sensors, pressure sensors etc.) or any other aftertreatment components.

The housing 152 can have any size or shape and be formed from any suitable material, for example metals (e.g., stainless steel, aluminum, alloys, etc.). The housing 152 includes a housing mounting surface 153 which is configured to be placed contiguous to or in contact with a frame 110 as described herein. The housing mounting surface 153 can include a flat surface or a curved surface at least a portion of which is positioned in contact with the frame 110. The housing mounting surface 153 includes a mounting aperture 155 defined therein. The mounting aperture 155 can include a throughhole or a cavity which can include coupling features to allow the fastener 142 included in the mounting assembly 120 as described herein to be coupled thereto. For example, threads can be defined on inner sidewalls of the mounting aperture and configured to receive mating threads defined on the fastener 142. In other embodiments, slots, grooves, notches, indents, nuts or any other coupling features can also be defined on the mounting aperture to allow the fastener 142 to be coupled thereto.

The housing 152 is coupled to the frame 110. The frame 110 can include a chassis (e.g., a chassis of a vehicle), a mounting structure particularly designed for securing the aftertreatment system 100, or any other structure for securing one or plurality of the housings 152 of the aftertreatment system 100. The frame 110 can include plates, bars, sheets or any other structure and formed from any suitable strong and rigid material, for example metals. The frame 110 has a frame first surface 113 and a frame second surface 115 opposite the frame first surface 113. The housing mounting surface 153 of the housing 152 is placed in contact with the frame first surface 113.

The frame 110 defines a frame throughhole 117. The frame throughhole 117 is axially aligned with the mounting aperture 155. It should be appreciated that, while FIG. 1 shows the housing 152 defining a single mounting aperture 155 and the frame 110 defining a single frame throughhole 117, in other embodiments the housing 152 can define a plurality of mounting apertures 155 and the frame 110 can define a plurality of frame throughholes 117 such that each of the plurality of frame throughholes 117 are axially aligned with the plurality of mounting apertures 155 of the housing 152. The frame thoughhole 117 can have any suitable cross-sectional shape, for example circular or non-circular (e.g., square, rectangular, oval, elliptical, polygonal, slots, etc.).

The housing 152 is removably coupled to or otherwise mounted on the frame 110 via a mounting assembly 120. The mounting assembly 120 includes a biasing member 122, a sleeve 132 and a fastener 142. The biasing member 122 includes a biasing member proximal end 123 and a biasing member distal end 125. As used herein, the term "distal" refers to positioned away from, facing away from or otherwise located distant from the housing of the aftertreatment system (e.g., the aftertreatment system 100 or 200). Similarly, as used herein the term "proximal" refers to positioned proximate to or facing towards the housing of the aftertreatment system. The biasing member proximal end 123 contacts the frame second surface 115 proximate to the frame throughhole 117. In various embodiments, the biasing member 122 includes a Belleville spring or a plurality of conical washers stacked atop each other to form a Belleville spring. In other embodiments, the biasing member 122 can include a rubber grommet, a compressible spacer, a helical spring, a conical spring, a spring element, an air spring, a leaf spring or any other suitable biasing member. Additionally, the biasing member 122 may be composed of several elements in parallel or in series. The biasing member 122, for example a Belleville spring can define a biasing member channel 127 therethrough. The biasing member channel 127 is axially aligned with the frame throughhole 117 and the mounting aperture 155.

In various embodiments, a bracket 162 is positioned between the frame 110 and the biasing member 122 such that the biasing member proximal end 123 is in contact with a bracket distal surface of the bracket 162. The bracket 162 can include a flat metal plate, a ring, a gasket (e.g., a rubber gasket) or any other flat member which is strong and rigid and can withstand the mounting force exerted by the mounting assembly 120 on the frame 110. The bracket 162 defines a bracket throughhole 165 which is aligned with the frame throughhole 117 and the biasing member channel 127 The bracket thoughhole 165 can have any suitable cross-sectional shape, for example circular or non-circular (e.g., square, rectangular, oval, elliptical, polygonal, slots, etc.). The bracket 162 can protect the frame 110 from damage from the mounting force or compressing force exerted by the biasing member 122.

In some embodiments, a spacer (not shown) can also be positioned between the housing mounting surface 153 of the housing 152 and the frame first surface 113 of the frame 110. The spacer can include a flat plate, for example a metal plate, a gasket (e.g., a metal or rubber gasket) or any other suitable flat member. The spacer defines a spacer throughhole axially aligned with the frame throughhole 117 and the housing mounting aperture 155. The spacer thoughhole can have any suitable cross-sectional shape, for example circular or non-circular (e.g., square, rectangular, oval, elliptical, polygonal, slots, etc.). The spacer can prevent damage to the housing 152 and/or the frame 110 because of the mounting force exerted by the mounting assembly 120 on the housing 152 and/or the frame 110. In various embodiments, the spacer and/or the bracket 162 can be coated with a friction modifying coating, for example a ceramic coating, a graphite coating, a low friction metal coating, or any other friction modifying coating. In various embodiments, the spacer can be formed from a material having a different coefficient of friction (e.g., lower coefficient of friction) than the housing 152 and/or the frame 110 to facilitate relative movement or sliding, for example due to thermal expansion.

In particular embodiments, the spacer can be formed from a low friction material, for example ceramics. Thus, the spacer and/or the bracket 162 can have a co-efficient of friction which is significantly lower than the co-efficient of friction of the frame 110 and the housing 152. The low coefficient of friction facilitates the sliding of the frame 110 and/or the housing 152 relative to each other to accommodate thermal expansion/or contraction of the housing 152 while limiting motion due to vibration.

The mounting assembly 120 also includes a sleeve 132 having a sleeve proximal end 133 and a sleeve distal end 135. The sleeve 132 defines a sleeve channel 137 therethrough. IN embodiments in which the bracket 162 is included, the sleeve proximal end 133 is inserted through the bracket throughhole 165 and the frame throughhole 117. In embodiments in which a spacer is positioned between the frame 110 and the housing 152, the sleeve 132 is also inserted through the spacer throughhole. The sleeve proximal end 133 is in contact with a rim of the mounting aperture 155. For example, a cavity, slot, groove, counterbore or detent can be defined around the rim of the mounting aperture 155. The sleeve proximal end 133 is positioned in the cavity, slot, groove or detent. Contact of the sleeve proximal end 133 with the rim of the mounting aperture 155 serves to limit the motion of the sleeve 132 towards the housing 152, as described in detail herein.

A sleeve distal end first surface of the sleeve 132 is in contact with the biasing member distal end 125 and engages the biasing member distal end 125 as described herein. The sleeve 132 can include a t-sleeve (i.e., having a cross-section resembling the letter "T"). The sleeve 132 is formed from a strong and rigid material configured to with stand the compressive force exerted by the fastener 142 and the tensile force exerted by the biasing member 12.

The fastener 142 includes a fastener proximal end 143 and a fastener distal end 145. The fastener 142 can include a screw, a bolt, or any other fastener. The fastener proximal end 143 is inserted through the sleeve channel 137 into the mounting aperture 155. The mounting aperture 155 can include threads or any other coupling features (e.g., slots, grooves, indents, etc.) defined on an inner surface of the mounting aperture 155 configured to couple to mating features defined on the fastener 142 (e.g., threads defined on the fastener proximal end 143).

The fastener proximal end 143 is inserted through the sleeve channel 137 into mounting aperture 155 until the fastener distal end 145 contacts a sleeve distal end second surface, opposite the sleeve distal end first surface, which is in contact with the biasing member distal end 125. For example, the fastener distal end 145 can include a head of a bolt or a screw which contacts the sleeve distal end second surface. The sleeve distal end 135 can be flared to provide a substantially flat surface for the fastener distal end 145 to contact and engage the sleeve distal end 125. In particular embodiment, a washer or any other compliance member can be positioned between the fastener distal end 145 and the sleeve distal end 135, for example to spread the compressive force exerted by the fastener distal end 145 over the washer or compliance member, thereby reducing stress zones and/or preventing damage to the sleeve 132 and the fastener 142.

The combination of the biasing member 122, the sleeve 132 and the fastener 142 couples the housing 152 to the frame 110 such that a constant pre-load is applied on the frame 110 and the housing 152 to limit vibration while allowing the housing 152 to thermally expand in the direction shown in FIG. 1. Expanding further, the fastener proximal end 143 is inserted into the mounting aperture 155 through the sleeve channel 137 of the sleeve 132 until the fastener distal end 145 contacts the sleeve distal end second surface of the sleeve 132. Further insertion of the fastener proximal end 143 into the mounting aperture 155 causes the fastener distal end 145 to engage the sleeve distal end 135 which, in turn causes the sleeve distal end 135 to engage the biasing member distal end 125. The engagement of the biasing member distal end 125 by the sleeve 132 causes the biasing member 122 to be at least partially compressed when the fastener proximal end 143 is coupled to the mounting aperture 155.

As the fastener 142 is progressively inserted into the mounting aperture 155, for example as it is threaded into the mounting aperture 155 via progressive rotations of the fastener 142, the fastener distal end 145 moves progressively towards the housing 152, further compressing the biasing member 122. The compression of the biasing member 122 causes the biasing member 122 to exert a force on the frame 110 urging the frame 110 towards the housing 152, thereby securing the housing 152 to the frame 110. The amount of force exerted by the biasing member 122 on the frame 110 is proportional to the amount of compression of the biasing member 122, and thereby the distance the fastener 142 is inserted into the mounting aperture 155. The compression of the biasing member 122 also creates a tension in the fastener 142 proportional to the compression of the biasing member 122.

The fastener 142 can be moved towards the housing 152 until the sleeve proximal end 133 contacts the rim of the mounting aperture 155. This prevents the sleeve 132 and thereby, the fastener 142 from being displaced any further towards the housing 152. For example, the sleeve 132 can be sized (e.g., have a length) to prevent the fastener distal end 145 from being inserted into the mounting aperture 155 beyond a predetermined distance d, as shown in FIG. 1. Any further insertion of the fastener 142 into the mounting aperture 155 (e.g., tightening of the fastener 142 via further rotations) exerts a compressive force on the sleeve 132 and an opposing tensile force on the fastener 142. This increase the tension in the fastener 142 but does not have any significant impact on the compression of the biasing member 122.

In the manner described above, the biasing member 122 applies a constant compressive force on the frame 110, while the fastener 142 inserted into and coupled to the mounting aperture 155 urges the housing 152 towards the frame 110, thereby coupling the frame 110 and the housing 152 via a constant force. However, using of the biasing member 122 to apply the compressive force allows the housing 152 to slide relative to the frame 110, thereby accommodating expansion or contraction of the housing 152 due to thermal loads while limiting motion due to vibration. The biasing member 122 and, thereby the compressive force exerted by the biasing member 122 can be varied based on particular design guidelines, for example, size of the frame 110 and/or aftertreatment housing 152, materials used, expected operating conditions, etc. In various embodiments, the biasing member 122 is compressed between 50% and 75% of an initial length of the biasing member 122. For example, the sleeve 132 can have a length configured to engage the rim of the mounting aperture 155 until the biasing member 122 is compressed between 50% and 75% of the initial length of the biasing member 122. Furthermore, the load exerted by biasing member 122 on the frame 110 can be in the range of 5,000 N to 7,000 N.

The mounting assembly 120 decouples the clamp force exerted on the frame 110 and the housing 152 from the fastener 142 to the biasing member 122. If the fastener 142 is solely used to exert the compressive force, such a compressive force can change over the life time of the aftertreatment system 100 due to thermal loads. In contrast, the mounting assembly 120 causes a constant clamp force to be exerted on frame 110 and housing member 152 by the biasing member 122 which limits vibration but accommodates thermal expansion or contraction of the housing 152 relative to the frame 110.

Figure 2:
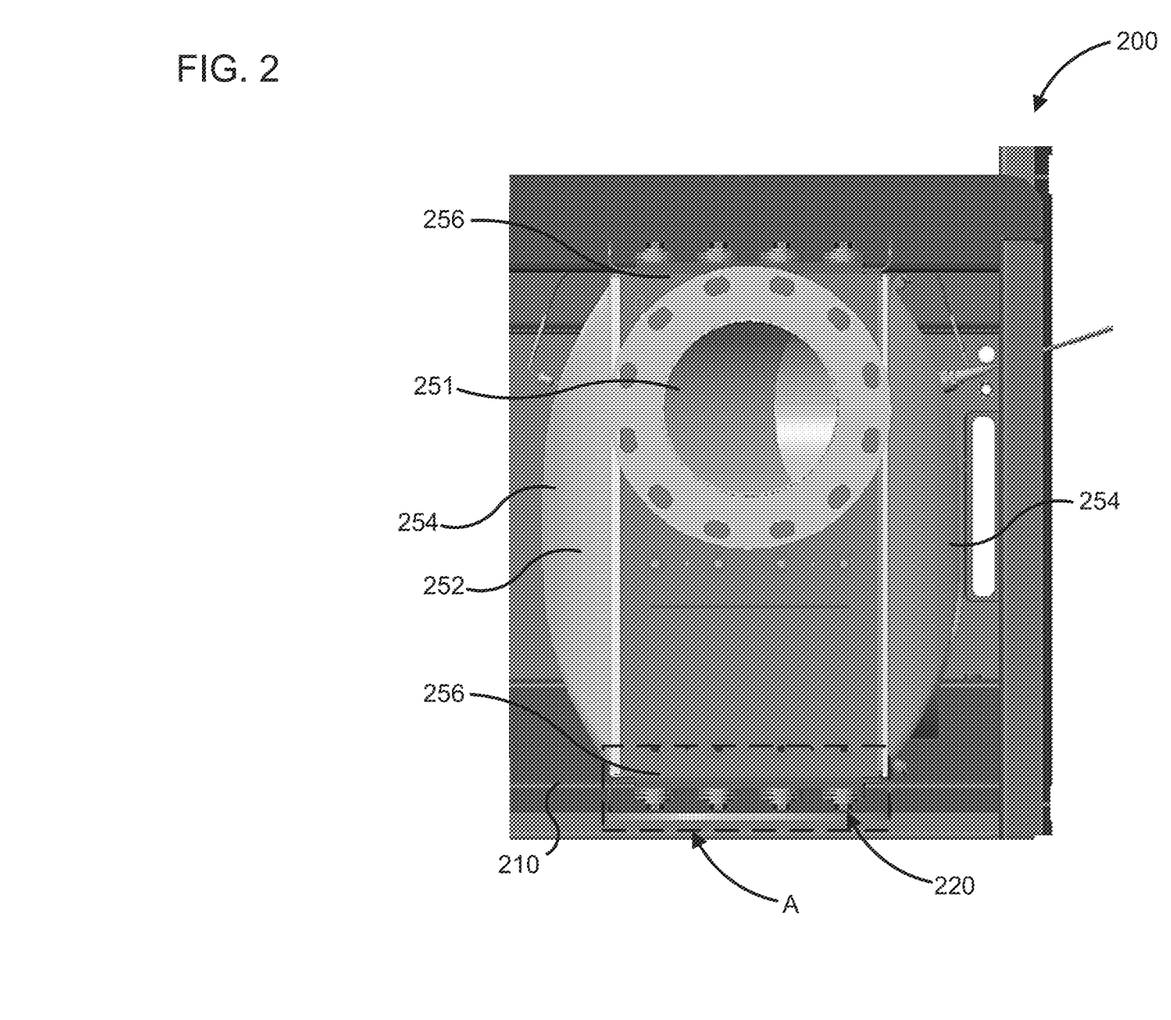
FIG. 2 is a front view of another embodiment of an aftertreatment system mounted on a frame using a plurality of mounting assemblies.

FIG. 2 is a side view of another embodiment of an aftertreatment system 200 mounted on a frame 210. The aftertreatment system 200 can be used to receive and treat an exhaust gas (e.g., an exhaust gas produced by a gasoline engine, a diesel engine, a natural gas engine, a dual-fuel engine, etc.) to decompose constituents of the exhaust gas flowing therethrough. The aftertreatment system 200 includes a housing 252 defining an internal volume within which various aftertreatment components such as an SCR system (e.g., the SCR system 150), particulate filters, oxidation catalysts, flow mixers, sensors (e.g., temperature sensors, oxygen sensors, NOx sensors, ammonia sensors, pressure sensors etc.) or any other aftertreatment components.

The housing 252 can have any size or shape and formed from any suitable material, for example metals (e.g., stainless steel, aluminum, alloys, etc.). As shown in FIG. 2 the housing 252 includes an inlet 251 for receiving the exhaust gas and communicating the exhaust gas to the internal volume of the housing 252. The housing 252 includes a pair of first sidewalls 254 oriented orthogonal to the frame which are curved and bulge out of the housing 252, and a pair of second sidewalls 256 positioned against opposite surfaces of the frame 210. In other embodiments, each of the pair of first sidewalls 254 and the pair of second sidewalls can be curved, contoured, flat or include any other features.

Figure 3:
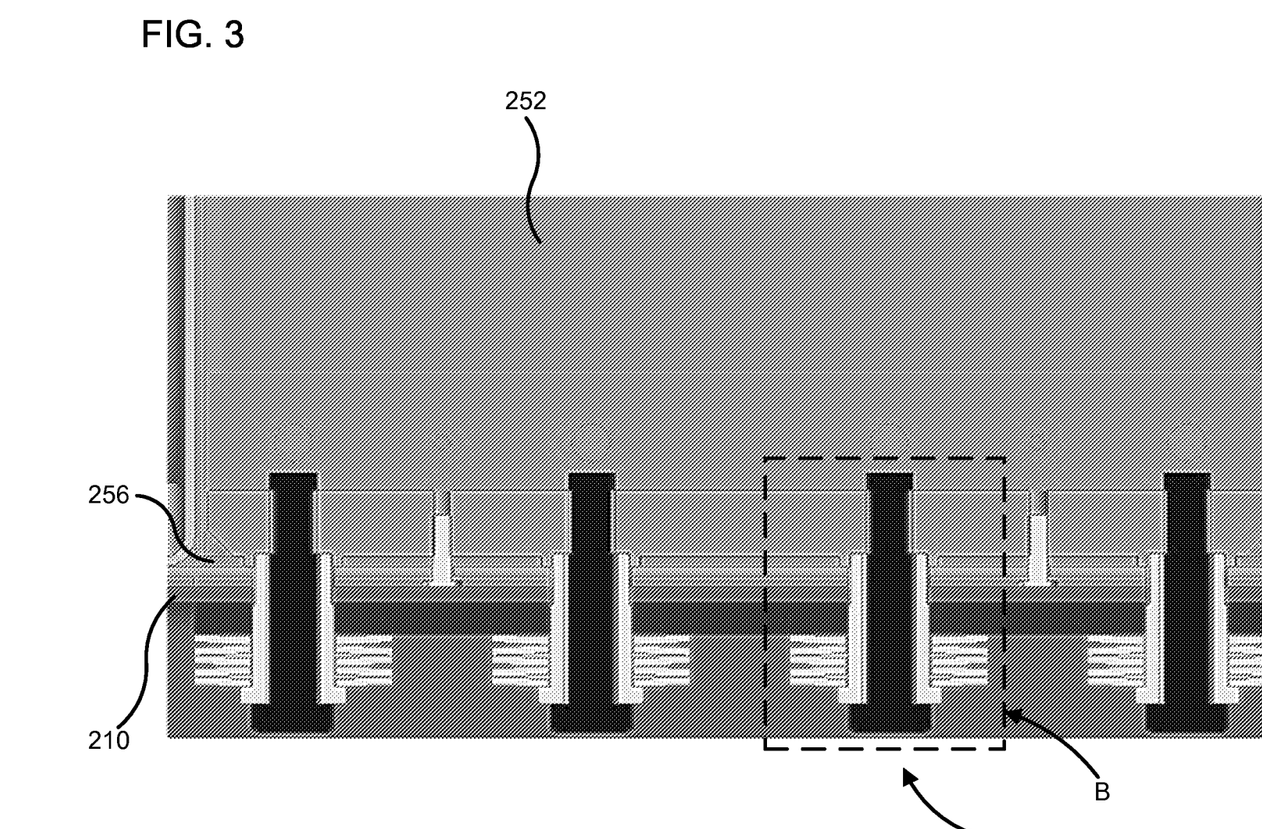
FIG. 3 is an enlarged front cross-section of a portion of the aftertreatment system of FIG. 2 shown by the arrow A in FIG. 2 which includes a plurality of mounting assemblies.
Figure 4:
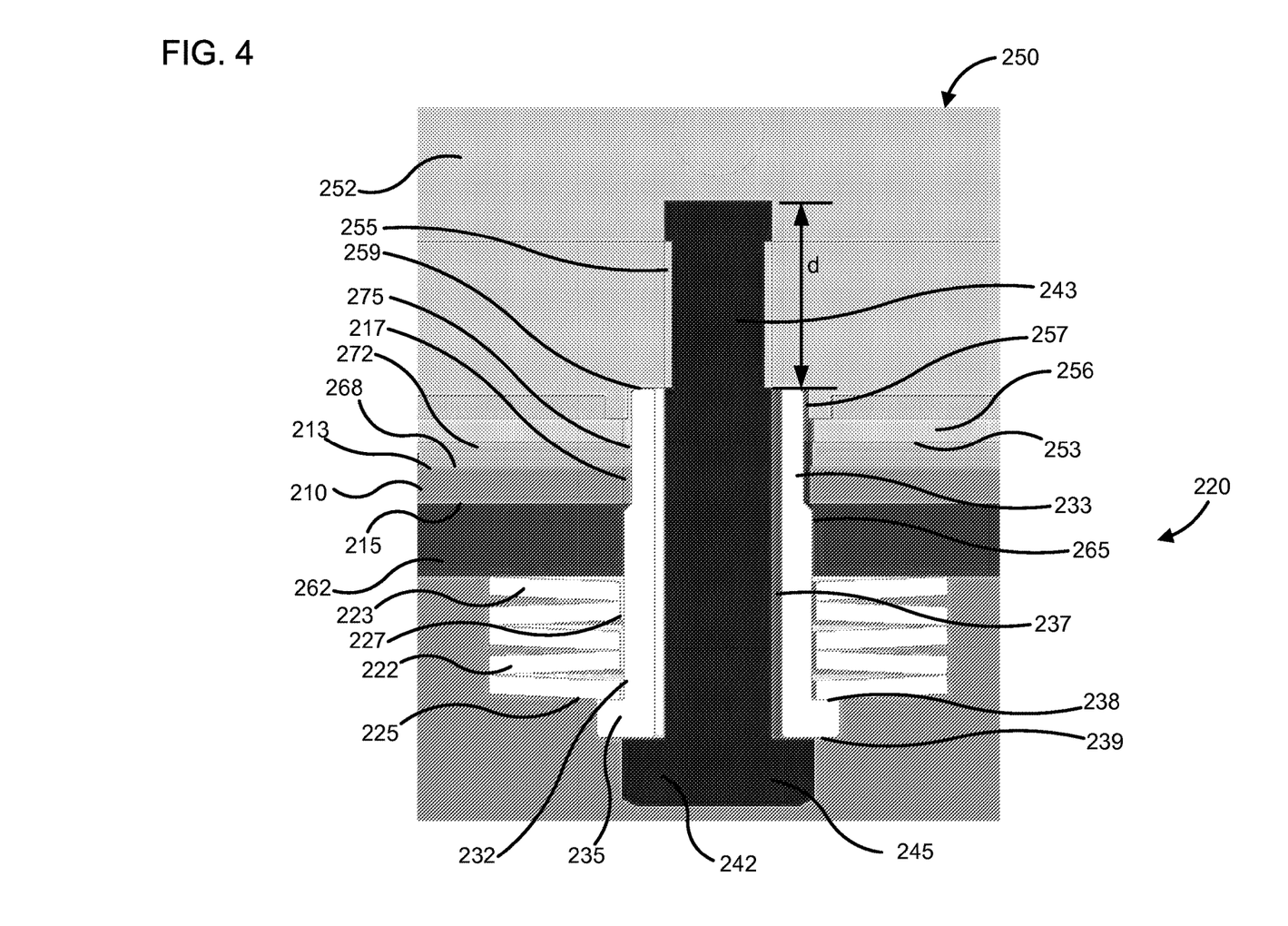
FIG. 4 is an enlarged front cross-section of a single mounting assembly of FIG. 3 shown by the arrow B in FIG. 3.

The housing 252 is removably coupled to the frame 210 using a plurality of mounting assemblies 220. FIG. 3 is an enlarged cross-section through of a portion of the aftertreatment system 200 shown by the arrow A in FIG. 2, showing a cross-section of a portion of the second sidewall 256, the frame 210 and the plurality of mounting assemblies 220 used to couple the second sidewall 256 of the housing 252 to the frame 210. FIG. 4 is an enlarged cross-section of a portion of the aftertreatment system 200 shown by the arrow B in FIG. 3 showing a single mounting assembly 220 coupling a portion of the frame 210 to the second sidewall 256 of the housing 252.

The second sidewall 256 of the housing 252 includes a housing mounting surface 253 which is positioned contiguous to or in contact with a spacer 272 positioned between the housing mounting surface 253 and the frame 210. A plurality of mounting apertures 255 are defined in the second sidewall 256. FIG. 3 shows a single mounting aperture 255 of the plurality of mounting apertures 255 defined in the second sidewall 256. The mounting aperture 255 includes a cavity which include coupling features to allow the fastener 242 included in the mounting assembly 220 as described herein to be coupled thereto. For example, threads can be defined on inner sidewalls of the mounting aperture 255 and configured to receive mating threads defined on the fastener 242. In other embodiments, slots, grooves, notches, indents, counter bores or any other coupling features can also be defined on the mounting aperture 255 to allow the fastener 242 to be coupled thereto.

The frame 210 can include a chassis (e.g., a chassis of a vehicle), a mounting structure particularly designed for securing the aftertreatment system 200, or any other structure for securing one or plurality of the aftertreatment system 200. The frame 210 can include plates, bars, sheets or any other structure and formed from any suitable strong and rigid material, for example metals. The frame 210 has a frame first surface 213 and a frame second surface 215 opposite the frame first surface 213. The housing mounting surface 253 of the housing 252 is placed in contact with the frame first surface 213.

The frame 210 defines a plurality of frame throughholes 217. The frame throughholes 217 are axially aligned with corresponding mounting apertures 255 of the housing 252. The frame thoughholes 217 can have any suitable cross-sectional shape, for example circular or non-circular (e.g., square, rectangular, oval, elliptical, polygonal, slots, etc.). The spacer 272 is positioned between the housing 252 and the frame 210. The spacer 272 can include a flat plate, for example a metal plate, a gasket (e.g., a metal or rubber gasket) or any other suitable flat member. The spacer 272 defines a spacer throughhole 275 axially aligned with the frame throughhole 217 and the housing mounting aperture 255. The spacer 272 can prevent damage to the housing 252 and/or the frame 210 because of the mounting force exerted by the mounting assembly 220 on the housing 252 and/or the frame 210.

In various embodiments, the spacer 272 can be coated with an coefficient of friction modifying coating, for example a ceramic coating, a graphite coating, carbon nanotubes, graphene, a low friction metal coating, or any other anti-friction coating. In particular embodiments, the spacer 272 can be formed from a low friction material, for example ceramics. The spacer 272 can have a co-efficient of friction which is significantly lower than the co-efficient of friction of the frame 210 and the housing 252. The spacer 272 thus allows the housing 252 to slip, slide or otherwise displace relative to the frame 210 to accommodate thermal growth by providing a low friction surface for the housing mounting surface 255 to slide on. This limits wear of the housing mounting surface 255, reduces stress and limits damage to the frame 210, the aftertreatment housing 252 and other mounting hardware, thereby extending the life of the coupling between the housing 252 and the frame 210.

As described before, the second sidewall 256 of the housing 252 is removably coupled to or otherwise mounted on the frame 210 via a plurality of mounting assemblies 220. Each of the plurality of mounting assembles 220 includes a biasing member 222, a sleeve 232 and a fastener 242. A bracket 262 is positioned between the frame 210 and the biasing member 222 such that a biasing member proximal end 223 of the biasing member 222 is in contact with a bracket distal surface of the bracket 262. The bracket 262 can include a flat metal plate, a ring, a gasket (e.g., a rubber gasket) or any other flat member which is strong and rigid and can withstand the mounting force exerted by the mounting assembly 220 on the frame 210. The bracket 262 defines a bracket throughhole 265 which is aligned with the frame throughhole 217 and the biasing member channel 227.

The bracket 262 can protect the frame 210 from damage from the mounting force or compressing force exerted by the biasing member 222. In particular embodiments, the bracket 262 can be formed from a low friction material, for example ceramics, or coated with a low friction modifying material, for example a ceramic coating, a graphite coating, carbon nanotubes, graphene, a low friction metal coating, or any other anti-friction coating. Similar to the spacer 272, the bracket 262 can also provide a low friction surface for the frame to 210 to slide thereon due to thermal growth, thereby minimizing wear to the frame 210 as well as reducing stress, avoiding damage to the frame 210, the housing 252 and any other mounting hardware.

The biasing member 222 includes the biasing member proximal end 223 and a biasing member distal end 225. The biasing member proximal end 223 contacts the bracket proximate to the bracket throughhole 265 and, thereby the frame throughhole 217. In various embodiments, the biasing member 222 includes a Belleville spring or a plurality of conical washers stacked atop each other to form the Belleville spring. In other embodiments, the biasing member 222 can include a rubber grommet, a compressible spacer, a helical spring, a conical spring, a spring element, an air spring, a leaf spring or any other suitable biasing member. Additionally, the biasing member 222 may be composed of several elements in parallel or in series. The biasing member 222, for example a Belleville spring defines a biasing member channel 227 therethrough. The biasing member channel 227 is axially aligned with the bracket throughhole 265 and thereby the frame throughhole 217, the spacer throughhole 275 and the mounting aperture 255.

The mounting assembly 220 also includes a sleeve 232 having a sleeve proximal end 233 and a sleeve distal end 235. The sleeve 232 defines a sleeve channel 237 therethrough. The sleeve proximal end 233 is inserted through the bracket throughhole 265, the frame throughhole 217 and the spacer throughhole 275 into a groove 257 defined in the second sidewall 256 of the housing 252 around a rim of the mounting aperture 255. The sleeve proximal end 233 is insertable into the groove 257 until it contacts a base 259 of the groove 257 around the rim of the mounting aperture 255. Contact of the sleeve proximal end 233 with the rim of the mounting aperture 255 serves to limit the motion of the sleeve 232 towards the housing 252, as described further in detail further below.

A sleeve distal end first surface 238 of the sleeve 232 is in contact with the biasing member distal end 225 and engages the biasing member distal end 225 as described herein. As shown in FIGS. 3 and 4, the sleeve 232 includes a t-sleeve (i.e., having a cross-section resembling the letter "T"). The sleeve 232 is formed from a strong and rigid material (e.g., metals such as stainless steel, aluminum or alloys) and configured to with stand the compressive force exerted by the fastener 242, and the tensile force exerted by the biasing member 122.

The fastener 242 includes a fastener proximal end 243 and a fastener distal end 245. The fastener 242 can include a screw, a bolt, or any other fastener. The fastener proximal end 243 is inserted through the sleeve channel 237 into the mounting aperture 255. The mounting aperture 255 can include threads or any other coupling features (e.g., slots, grooves, indents, etc.) defined on an inner surface of the mounting aperture 255 configured to couple to mating features defined on the fastener 242 (e.g., threads defined on the fastener proximal end 243).

The fastener proximal end 243 is inserted through the sleeve channel 237 into mounting aperture 255 until the fastener distal end 245 contacts a sleeve distal end second surface 239 opposite the sleeve distal end first surface 238 which is in contact with the biasing member distal end 225. For example, the fastener distal end 245 can include a head of a bolt or a screw which contacts the sleeve distal end second surface 239. The sleeve distal end 235 is flared to provide a substantially flat surface for the fastener distal end 245 to contact and engage the sleeve distal end 235. In particular embodiment, a washer or any other compliance member can be positioned between the fastener distal end 245 and the sleeve distal end 235, for example to spread the compressive force exerted by the fastener distal end 245 over the washer or compliance member, thereby reducing stress zones and/or preventing damage to the sleeve 232 and the fastener 242.

The combination of the biasing member 222, the sleeve 232 and the fastener 242 couples the housing 252 to the frame 210 such that a clamp load is applied on the frame 210 and the housing 252 while allowing the housing 252 to thermally expand or contract while limiting vibration. Expanding further, the fastener proximal end 243 is inserted into the mounting aperture 255 through the sleeve channel 237 of the sleeve 232 until the fastener distal end 245 contacts the sleeve distal end second surface 239 of the sleeve 232. Further insertion of the fastener proximal end 243 into the mounting aperture 255 causes the fastener distal end 245 to engage the sleeve distal end 235 which, in turn causes the sleeve distal end 235 to engage the biasing member distal end 225. The engagement of the biasing member distal end 225 by the sleeve 232 causes the biasing member 222 to be at least partially compressed when the fastener proximal end 243 is coupled to the mounting aperture 255.

As the fastener 242 is progressively inserted into the mounting aperture 255, for example as it threadedly engages the mounting aperture 255 via progressive rotations of the fastener 242, the fastener distal end 245 moves progressively towards the housing 252, further compressing the biasing member 222. The compression of the biasing member 222 causes the biasing member 222 to exert a force on the frame 210 urging the frame 210 towards the housing 252, thereby securing the housing 252 to the frame 210. The amount of force exerted by the biasing member 222 on the frame 210 is proportional to the amount of compression of the biasing member 222, and thereby the distance the fastener 242 is inserted into the mounting aperture 255. The compression of the biasing member 222 also creates a tension in the fastener 242 proportional to the compression of the biasing member 222.

The fastener 242 can be moved towards the housing 252 until the sleeve proximal end 233 contacts the base 259 of the groove 257 defined around the rim of the mounting aperture 255. This prevents the sleeve 232 and thereby, the fastener 242 from being displaced any further towards the housing 252. For example, the sleeve 232 can be sized to prevent the fastener distal end 245 from being inserted into the mounting aperture 255 beyond a predetermined distance d, as shown in FIG. 4. Any further insertion of the fastener 242 into the mounting aperture 255 (e.g., tightening of the fastener 242 via further rotations) exerts a compressive force on the sleeve 232 and an opposing tensile force on the fastener 242. This increase the tension in the fastener 242 but does not have any significant impact on the compression of the biasing member 222.

In the manner described above, the biasing member 222 applies a constant compressive force on the frame 210, while the fastener 242 inserted into and coupled to the mounting aperture 255 urging the housing 252 towards the frame 210. The mounting assembly 220 allows the housing 252 to slide relative to the frame 210, thereby accommodating expansion or contraction of the housing 252 due to thermal loads, while maintaining a constant force on the frame 210 and the housing 252 to limit vibration. The biasing member 222 and, thereby the compressive force exerted by the biasing member 222 can be varied based on particular design guidelines, for example, size of the frame 210 and/or aftertreatment housing 252, materials used, expected operating conditions, etc. In various embodiments, the biasing member 222 is compressed between 50% and 75% of an initial length of the biasing member 222. For example, the sleeve 232 can have a length configured to engage the base 259 of the groove 257 until the biasing member 222 is compressed between 50% and 75% of the initial length of the biasing member 222. Furthermore, a load exerted by biasing member 222 on the frame 210 can be in the range of 5,000 N to 7,000 N.

In the above manner, the plurality of mounting assemblies 220 decouple the clamp force exerted on the frame 210 and the housing 252 from the fasteners 242 to the biasing members 222 included in each of the plurality of mounting assemblies 220. If the fasteners 242 are solely used to exert the compressive force, such a compressive force can change over the life time of the aftertreatment system 200 due to thermal loads. In contrast, the mounting assemblies 220 cause a constant clamp force to be exerted on the frame 210 and housing member 252 while accommodating thermal expansion of the housing 252 of the aftertreatment system 200.

Figure 5:
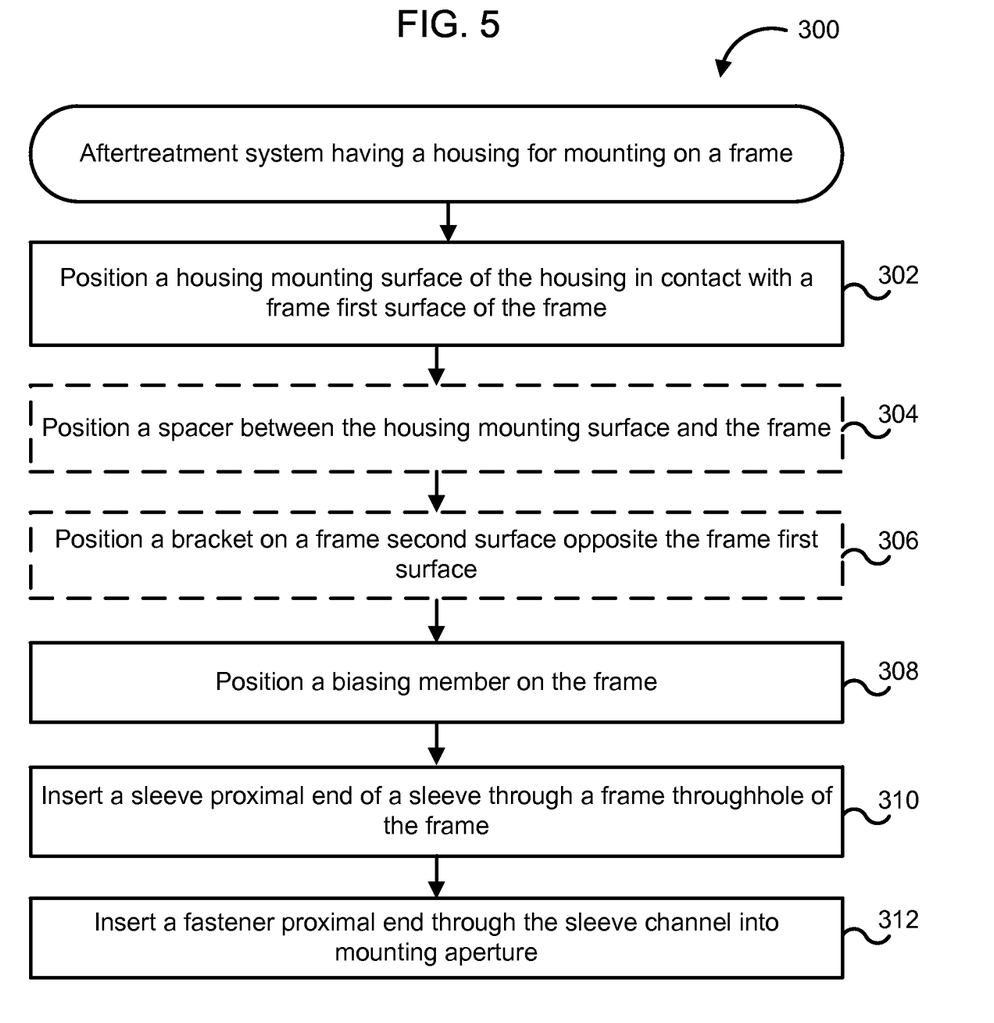
FIG. 5 is a schematic flow diagram of an embodiment of a method of mounting a housing of an aftertreatment system to a frame.

FIG. 5 is a schematic flow diagram of an example method 300 for coupling to or otherwise mounting a housing of an aftertreatment system (e.g., the housing 152 or 252 of the aftertreatment system 100 or 200, respectively) on a frame (e.g., the frame 110 or 210).

The method 300 includes positioning a housing mounting surface of the housing of the aftertreatment system in contact with a frame first surface of the frame at 302. At least one mounting aperture defined in the housing mounting surface is axially aligned with at least one frame throughhole defined in the frame. For example, the housing mounting surface 153 or 253 of the housing 152 or 252 is positioned in contact with the frame 110 or 210 so that the at least one mounting aperture 155 or 255 of the housing 152 or 252 is aligned with at least one corresponding frame throughhole 117 or 217 defined in the frame 110 or 210.

In various embodiments, a spacer is positioned between the housing mounting surface of the housing and the frame first surface of the frame at 304. For example, the spacer 272 can be positioned between the housing mounting surface 253 and the frame first surface 213 so that the spacer throughhole 275 defined in the spacer 272 is axially aligned with the frame throughhole 217 and the mounting aperture 255 of the housing 252.

In various embodiments, a bracket is positioned on a frame second surface of the frame opposite the frame first surface at 306. For example, the bracket 162 or 262 is positioned on the frame second surface 115 or 215 of the frame 110 or 210. A bracket throughhole 165 or 265 of the bracket 162 or 262 is axially aligned with the frame throughhole 117 or 217 of the frame 110 or 210.

A biasing member is positioned on the frame at 308. The biasing member includes a biasing member proximal end and a biasing member distal end. The biasing member proximal end is positioned on a frame second surface of the frame opposite the frame first surface proximate to the frame throughhole. For example, the biasing member proximal end 123 or 223 of the biasing member 122 or 222 is positioned on the frame second surface 115 or 215 of the frame 110 or 210. A biasing member channel 127 or 227 of the biasing member 122 or 222 is axially aligned with the frame throughhole 117 or 217 of the frame 110 or 210 In embodiments, in which a bracket (e.g., the bracket 162 or 262) is positioned in contact with the frame second surface (e.g., the frame second surface 115 or 215 of the frame 110 or 210), the biasing member proximal end (e.g., the biasing member proximal end 123 or 223 of the biasing member 122 or 222) contacts a bracket distal surface of the bracket (e.g., the bracket 162 or 262). Furthermore, a biasing member channel (e.g., the biasing member channel 127 or 227 of the biasing member 122 or 222) is axially aligned with the bracket throughhole (e.g., the bracket throughhole 165 or 265 of the bracket 162 or 262).

A sleeve proximal end of a sleeve is inserted through a frame throughhole of the frame and a mounting aperture of the housing at 310. The sleeve defines a sleeve channel therethrough. A sleeve distal end of the sleeve extends distal from the frame and is in contact with the biasing member distal end. For example, the sleeve proximal end 133 or 233 of the sleeve 132 or 232 is inserted through the frame throughhole 117 or 217 of the frame 110 or 210, into the groove 257 defined around the rim of the mounting aperture 155 or 255 of the housing 252 or 252. In various embodiments, in which a bracket (e.g., the bracket 162 or 262) is positioned between the frame (e.g., the frame 110 or 210) and the biasing member (e.g., the biasing member 122 or 222), the sleeve (e.g., the sleeve 132 or 232) is also inserted through the bracket throughhole (e.g., the bracket throughhole 165 or 265 of the bracket 162 or 262). In various embodiments, in which a spacer (e.g., the spacer 272) is positioned between the frame first surface (e.g., the frame first surface 213 of the frame 210) and the housing mounting surface (e.g., the housing mounting surface 253 of the housing 252), the sleeve (e.g., the sleeve 232) is also inserted through the spacer throughhole (e.g., the bracket throughhole 265 of the bracket 262).

A fastener proximal end of a fastener is inserted through the sleeve channel into the mounting aperture at 312. The fastener proximal end is coupled to the mounting aperture and a fastener distal end of the fastener engages the sleeve distal end to at least partially compress the biasing member. For example, the fastener 142 or 242 is inserted through the sleeve channel 137 or 237 of the sleeve 132 or 232 into the mounting aperture 155 or 255 of the housing 152 or 252 and coupled to mating features, for example threads defined in the mounting aperture 155 or 255.

The fastener distal end 145 or 245 of the fastener 142 or 242 engages the sleeve distal end 135 or 235 of the sleeve 132 or 232 urging the sleeve 132 or 232 towards the housing 152 or 252. The movement of the sleeve 132 or 232 causes the sleeve distal end 135 or 235 to engage the biasing member distal end 125 or 225 of the biasing member 122 or 222, thereby compressing the biasing member 122 or 222. In this manner, a compressive force is exerted on the frame 110 or 210, or through the bracket 162 or 262 positioned between the frame 110 or 210 and the biasing member 122 or 222. The compressive force exerted by the biasing member 122 or 222 on the frame 110 or 210 secures the housing 152 or 252 to the frame 110 or 210 while allowing thermal growth of the housing 152 or 252 relative to the frame 110 or 210 as described before herein.

In particular embodiments, the biasing member is compressed between 50% and 75% of an initial length of the biasing member. The fastener (e.g., the fastener 142 or 242) is insertable into the mounting aperture (e.g., the mounting aperture 155 or 255) until the sleeve proximal end of the sleeve (e.g., the sleeve proximal end 133 of 233 of the sleeve 132 or 232) contacts a rim of the mounting aperture (e.g., the sleeve distal end 235 of the sleeve 232 contacts a base 259 of a groove 257 defined about the rim of the mounting aperture 255 of the housing 252). The sleeve can define a length configured to prevent the fastener proximal end (e.g., the fastener proximal end 143 or 243) from being inserted beyond a predetermined distance into the mounting aperture (e.g., the mounting aperture 155 or 255).

The fastener and sleeve can be configured such that the fastener (e.g., the fastener 142 or 242) is under tension and the sleeve (e.g., the sleeve 132 or 232) is under compression, thereby maintaining a constant force on the frame (e.g., the frame 110 or 210) and the housing (e.g., the housing 152 or 252) via the biasing member (e.g., the biasing member 122 or 222) under thermal loads while limiting motion due to vibration. In various embodiments, the biasing member (e.g., the biasing member 122 or 222) is compressed between 50% and 75% of an initial length of the biasing member. In various embodiments, the force exerted by the biasing member on the frame is in the range of 5,000 N to 7,000 N.

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An assembly for an aftertreatment system, comprising:
   a housing defining an internal volume for housing components of the aftertreatment system, the housing including a housing mounting surface, a mounting aperture defined in the housing mounting surface, and a groove defined in a sidewall of the housing around a rim of the mounting aperture;
   a frame having a frame first surface and a frame second surface opposite the frame first surface, the frame defining a frame throughhole therethrough, the housing mounting surface positioned in contact with the frame first surface such that the frame throughhole is axially aligned with the mounting aperture;
   a biasing member including a biasing member proximal end and a biasing member distal end;
   a sleeve having a sleeve proximal end and a sleeve distal end, wherein the sleeve defines a sleeve channel therethrough, wherein the sleeve proximal end is inserted through the frame throughhole into the groove defined in the sidewall of the housing;
   a fastener including a fastener proximal end and a fastener distal end, the fastener proximal end inserted through the sleeve channel into the mounting aperture and removably coupled to the mounting aperture; and
   a spacer positioned between the frame first surface and the housing mounting surface, the spacer defining a spacer throughhole axially aligned with the frame throughhole and the mounting aperture, wherein the sleeve proximal end and the fastener proximal end are inserted through the spacer throughhole, and wherein a co-efficient of friction of the spacer is lower than a coefficient of friction of each of the frame first surface and the housing mounting surface, thereby allowing the housing to displace relative to the frame so as to accommodate thermal expansion of the housing.

2. The assembly of claim 1, wherein the biasing member defines a biasing member channel therethrough, the biasing member channel axially aligned with the frame throughhole.

3. The assembly of claim 1, further comprising:
a bracket positioned between the frame and the sleeve, the biasing member proximal end in contact with a bracket distal surface of the bracket, the bracket defining a bracket throughhole therethrough, the bracket throughhole axially aligned with the frame throughhole,
wherein the sleeve proximal end is inserted through the bracket throughhole.

4. The assembly of claim 1, wherein the sleeve proximal end is in contact with a rim of the mounting aperture, a sleeve distal end second surface of the sleeve opposite the sleeve distal end first surface in contact with the fastener distal end, the sleeve preventing the fastener proximal end from being inserted into the mounting aperture beyond a predetermined distance.

5. The assembly of claim 1, wherein the sleeve distal end engages the biasing member distal end such that the biasing member is compressed at least partially when the fastener proximal end is coupled to the mounting aperture.

6. The assembly of claim 5, wherein the biasing member is compressed between 50% and 75% of an initial length of the biasing member.

7. The assembly of claim 5, wherein a load exerted by the biasing member on the frame is in the range of 5,000 N to 7,000 N.

8. The assembly of claim 5, wherein the fastener and the sleeve are configured such that the fastener is under tension and the sleeve is under compression, the fastener and the sleeve maintaining a constant force on the frame and the housing via the biasing member under thermal growth.

9. A mounting assembly for mounting a housing including a housing mounting surface and at least one mounting aperture to a frame defining a frame throughhole therethrough, the frame throughhole axially aligned with the at least one mounting aperture, the mounting assembly comprising:
a biasing member including a biasing member proximal end and a biasing member distal end;
a sleeve having a sleeve proximal end and a sleeve distal end, wherein the sleeve defines a sleeve channel therethrough, wherein the sleeve proximal end is configured to be inserted through the frame throughhole;
a fastener having a fastener proximal end and a fastener distal end, the fastener proximal end insertable through the sleeve channel into the mounting aperture and removably coupleable to the mounting aperture; and
a spacer positionable between a frame first surface of the frame and the housing mounting surface, the spacer defining a spacer throughhole therethrough configured to be axially aligned with the frame throughhole and the mounting aperture,
wherein the sleeve proximal end and the fastener proximal end are insertable through the spacer throughhole, and
wherein the spacer has a co-efficient of friction which is lower than a coefficient of friction of each of the frame first surface and the housing mounting surface, thereby allowing the housing to displace relative to the frame so as to accommodate thermal expansion of the housing.

10. The mounting assembly of claim 9, wherein the biasing member defines a biasing member channel therethrough, the biasing member channel configured to be axially aligned with the frame throughhole.

11. The mounting assembly of claim 9, wherein the biasing member includes a Belleville spring.

12. The mounting assembly of claim 9 further comprising:
a bracket positionable between the frame and the sleeve so that the biasing member proximal end is in contact with a bracket distal surface, the bracket defining a bracket throughhole therethrough, the bracket throughhole axially alignable with the frame throughhole,
wherein the sleeve proximal end and the fastener proximal end are insertable through the bracket throughhole.

13. The mounting assembly of claim 9, wherein the sleeve proximal end is configured to contact a rim of the mounting aperture, a sleeve distal end second surface of the sleeve opposite the sleeve distal end first surface configured to contact the fastener distal end, the sleeve configured to prevent the fastener proximal end to be inserted into the mounting aperture beyond a predetermined distance.

14. The mounting assembly of claim 9, wherein the sleeve distal end is configured to engage the biasing member distal end such that the biasing member is compressed at least partially when the fastener proximal end is coupled to the mounting aperture.

15. The mounting assembly of claim 14, wherein the biasing member is compressed between 50% and 75% of an initial length of the biasing member.

16. The mounting assembly of claim 14, wherein a load exerted by the biasing member on the frame is in the range of 5,000 N to 7,000 N.

17. The mounting assembly of claim 14, wherein the fastener and the sleeve are configured such that the fastener is under tension and the sleeve is under compression, the fastener and the sleeve maintaining a constant force on the frame and the housing via the biasing member under thermal growth.

18. A method of mounting an aftertreatment system on a frame, comprising:
positioning a housing mounting surface of a housing of the aftertreatment system in contact with a frame first surface of the frame, at least one mounting aperture defined in the housing mounting surface axially aligned with at least one frame throughhole defined in the frame;
inserting a spacer positioned between the frame first surface and the housing mounting surface, the spacer defining a spacer throughhole axially aligned with the frame throughhole and the mounting aperture;
positioning a biasing member on the frame, the biasing member including a biasing member proximal end and a biasing member distal end, the biasing member proximal end positioned on a frame second surface of the frame opposite the frame first surface, the biasing member positioned proximate to the frame throughhole;
inserting a sleeve proximal end of a sleeve through the frame throughhole, the sleeve defining a sleeve channel, a sleeve distal end of the sleeve extending distal from the frame and in contact with the biasing member distal end; and
inserting a fastener proximal end of a fastener through the sleeve channel into the mounting aperture, the fastener proximal end coupled to the mounting aperture, a fastener distal end of the fastener engaging the sleeve distal end to at least partially compress the biasing member, wherein the sleeve proximal end and the fastener proximal end are inserted through the spacer throughhole, and wherein a co-efficient of friction of the spacer is lower than a coefficient of friction of each of the frame first surface and the housing mounting surface, thereby allowing the housing to displace relative to the frame so as to accommodate thermal expansion of the housing.

19. The method of claim 18, further comprising:

positioning a bracket between the frame and the biasing member, the biasing member proximal end in contact with a bracket distal surface of the bracket, the bracket defining a bracket throughhole therethrough, the bracket throughhole axially aligned with the frame throughhole, wherein the sleeve proximal end and the fastener proximal end are inserted through the bracket throughhole.

20. The method of claim 18, wherein the biasing member is compressed between 50% and 75% of an initial length of the biasing member.

21. The method of claim 18, wherein the fastener and the sleeve are configured such that the fastener is under tension and the sleeve is under compression, the fastener and the sleeve maintaining a constant force on the frame and the housing via the biasing member under thermal growth.

22. The method of claim 18, wherein the biasing member defines a biasing member channel therethrough, the biasing member channel axially aligned with the frame throughhole.

\* \* \* \* \*